United States Patent [19]

Flower

[11] Patent Number: 5,758,879
[45] Date of Patent: Jun. 2, 1998

[54] BRUSH SEAL ASSEMBLY

[75] Inventor: Ralph Franklyn John Flower, Devizes, England

[73] Assignee: Cross Manufacturing Company (1938) Limited, England

[21] Appl. No.: 821,173

[22] Filed: Mar. 21, 1997

Related U.S. Application Data

[63] Continuation of Ser. No. 190,071, filed as PCT/GB92/01417, Jul. 31, 1992, published as WO93/03299, Feb. 18, 1993, abandoned.

[30] Foreign Application Priority Data

Aug. 1, 1991 [GB] United Kingdom .................. 9116655

[51] Int. Cl.[6] ...................................... F16J 15/447
[52] U.S. Cl. ........................................ 277/303; 277/355
[58] Field of Search ............... 277/53, 1; 415/174.5, 415/174.2

[56] References Cited

U.S. PATENT DOCUMENTS

| | | | |
|---|---|---|---|
| 885,032 | 4/1908 | De Ferranti | 277/53 |
| 4,756,536 | 7/1988 | Belcher | 277/53 |
| 5,074,748 | 12/1991 | Hagle | 277/53 |
| 5,106,104 | 4/1992 | Atkinson et al. | 277/53 |
| 5,201,530 | 4/1993 | Kelch et al. | 277/53 |
| 5,335,920 | 8/1994 | Tseng et al. | 277/53 |
| 5,480,165 | 1/1996 | Flower | 277/53 |

FOREIGN PATENT DOCUMENTS

| | | |
|---|---|---|
| 0391676 | 10/1990 | European Pat. Off. . |
| 2021210 | 11/1979 | United Kingdom . |
| 2033026 | 5/1980 | United Kingdom . |
| 2119037 | 11/1983 | United Kingdom . |
| 2198195 | 6/1988 | United Kingdom . |

*Primary Examiner*—Daniel G. DePumpo
*Attorney, Agent, or Firm*—Andrus, Sceales, Starke & Sawall

[57] ABSTRACT

A brush seal assembly for effecting a seal between two relatively movable machine components has a carrier for moving on one component (12) and having two spaced rows (16 and 17) of bristles projecting towards the surface of the other component (11) to be sealed to said one component (12). Backing plates (18 and 19) are provided on the low pressure side of each row (17 and 18) of bristles respectively. The physical characteristics of the bristles of each row are selected to share the total pressure drop between the two rows of bristles, and preferably to be equally shared.

8 Claims, 2 Drawing Sheets

BRUSH SEAL ASSEMBLY

This application is a continuation of application Ser. No. 08/190,071, filed as PCT/GB92/01417 Jul. 31, 1992, published as WO93/03299 Feb. 18, 1993, now abandoned.

This invention relates to a brush seal assembly adapted to effect a seal between a first component and a surface of a second component which is relatively movable with respect to the first component. The invention also extends to a method of sealing a first component to a relatively movable second component.

It is frequently necessary to effect a fluid-tight seal between two relatively movable components, such as between a rotatable shaft and a housing having a bore through which the shaft extends. Innumerable seal designs have been proposed for this purpose and a machine designer has to select the most appropriate type of seal, having regard to the likely operating conditions to be encountered in service.

For the case of a shaft extending through a bore in a housing and where the shaft rotates at a relatively high speed and in the presence of pressurized hot gases, such as may be encountered in a gas turbine or a jet engine, various designs of brush seal have been developed in an attempt to overcome the unsatisfactory performance of simpler designs such as labyrinth seals. In a brush seal, a plurality of fine bristles (such as of bronze or stainless steel wire) are held in a carrier mounted on the housing, with the tips of the bristles wiping the surface of the shaft so as to effect a seal thereagainst. Alternatively, the carrier could be mounted on the shaft with the bristle tips wiping against the housing, but this configuration does generally give rise to higher relative speeds between the bristle tips and the component against which they effect a seal.

In a typical brush seal intended for use with a pressure difference thereacross, the bristles are supported against deflection in a direction parallel to the shaft axis for the greater part of the length of the bristles by means of an annular backing plate on the low-pressure side of the seal, with the tips of the bristles projecting radially beyond the backing plate to wipe against the shaft surface to be sealed. If it can be expected that the shaft is likely to perform relatively large radial excursions—for a instance, as an engine rotor is being run up to operating, speed—the clearance between the backing plate and the shaft must be increased, so leading to a greater unsupported length of bristle, projecting beyond the backing plate. If then the seal is subjected to a relatively large pressure difference, the unsupported bristle tips projecting beyond the backing plate will tend to deflect towards the low pressure side and so lift clear of the shaft, and the sealing effect will be lost. If the bristles are made stiffer (for example by increasing the diameter of each bristle) the bristles may be too stiff to give an adequate sealing function able to accommodate minor radial excursions between the shaft and the housing; also rapid wear of the shaft may be expected as a consequence of the relatively stiff bristles wiping the shaft.

it is a principal aim of the present invention to provide a brush seal assembly adapted to effect a seal between two relatively movable components for a situation where the seal assembly is likely to be subjected to relatively great pressure differences thereacross, and which seal assembly is nevertheless still able to achieve a good sealing effect.

According to a first aspect to the present invention, there 15 provided a brush seal assembly for effecting a seal between a first component and a surface of a second component relatively movable with respect to the first component, which seal assembly comprises a carrier adapted for mounting on the first component and including a backing plate which extends towards said surface of the second component, a first row of bristles lying against the backing plate to project therebeyond towards said surface of the second component, and a second row of bristles spaced from said first row of bristles but also arranged to project towards said surface of the second component, a majority of the bristles of the second row each having physical characteristics different from those of each of a majority of the bristles of the first row.

In the following further description of the present invention, reference will primarily be made to the sealing of a housing (the first component) to a rotatable shaft (the second component) extending through a bore in the housing. It will however be understood that the brush seal assembly of this invention may be used with the carrier mounted on the shaft to effect a seal against a surface of the housing or to effect a seal between other relatively movable components besides a housing and a shaft, such as between an engine nozzle and the engine housing. References herein to a housing and to a shaft should be construed accordingly.

It will be appreciated that a brush seal assembly of the present invention is able to accommodate relatively large pressure differences across the seal, by virt of the two rows of bristles. The performance of the eal may be optimized by ensuring that the pressure drop across the first row of bristles is at least comparable to, if not substantially equal to, the pressure drop across the second row of bristles. This may be achieved by appropriate selection of the materials of the bristles of the two rows and the physical characteristics of those bristles. Some applications may permit different pressure drops across the rows, the total pressure still being shared amongst all of the rows.

Most preferably, in the seal assembly of this invention, a second backing plate is provided for the bristles of the second row. Advantageously, the radial extent of said second backing plate is substantially the same as that of the first-mentioned backing plate, with the bristle of the second row projecting beyond that second backing plate by substantially the same amount as the bristles of the first row. In this way, the bristles of the second row may accommodate substantially the same excursions of the second component with respect to the first component, without damage resulting to the seal assembly.

The physical characteristics of the bristles of the two rows may be selected empirically, having regard to the intended operating conditions for a particular seal assembly. Thus, the selection of the appropriate physical characteristics for the bristles of the two rows may depend, amongst others, upon the total pressure difference to which the seal is subjected, the temperature on the high pressure side of the seal and the ambient temperature on the low pressure side thereof, the diameter and intended rotational rate of the shaft against which the tips of the two rows of bristles effect a seal, the nature or the gases on the high pressure side of the seal, and so on. When these operating parameters have been determined, then a selection of the appropriate materials for manufacturing the two rows of bristles may be made. In doing this, due regard may be made to the following physical characteristics, for the bristles in each row thereof: the number of bristles; the cross-sectional dimensions of bristles; the length of the bristles; and the material from which each bristle is made. Moreover, the cross-sectional profile (shape) of the bristles need not be circular, and so may be selected having regard to the intended sealing effect. In that case, the orientation of each bristle may also be adjusted to suit the circumstances.

The characteristics for each row of bristles may also be controlled by including bristles having different characteristics in each row. Thus, the mixture of the different kinds of bristles in the two rows may be altered, so as to give rise to the required physical characteristics for each row of bristles, considered as a whole, so as thereby to allow an optimum seal performance.

Yet another possibility, in order to obtain a seal assembly with the required physical characteristics as a whole, would be to vary the interference or clearance between the bristle tips and the surface against which those tips seal, for the two rows respectively. Thus, there may be a first interference or clearance at the tips of the bristles of the first row, and a second interference or clearance at the tips of the bristles of the second row which second interference or clearance is different from said first interference or clearance. In this way, a greater leakage past the tips of the bristles of one row may be obtained as compared to the tips of the bristles of the other row, whereby a balancing of the pressure drops across each of the two rows may be achieved.

In a modified seal of this invention, there is provided within the space between said first and second rows of bristles one or more further rows of bristles configured generally similarly to said first and second rows of bristles, but spaced from both of said first and second rows of bristles. The physical characteristics of the or each further row of bristles disposed between said first and second rows of bristles may be the same as either one of said first and second rows of bristles, or different yet again from both said first and second rows of bristles. However, optimization of the performance of such a seal having more than two rows of bristles may be obtained by aiming at balancing the pressure drops across each row of bristles so as to be substantially uniform. The control of the physical characteristic of the or each further row of bristles may be obtained in the same manner as has been described above, for said first and second rows of bristles.

The free end of each backing plate may be provided with an abraidable rubbing surface which may be contacted by the shaft should the latter perform larger than expected excursions, for example as the shaft is running up to its normal rotational speed. The rubbing surface may then wear away as much as is necessary to accommodate the excursions whilst still maintaining at a minimum the clearance between the free end of the backing plate and the shaft. Such rubbing surfaces are known per se, in the brush seal art.

According to a second aspect of the present invention, there is provided a method of sealing a first component to a surface of a second component relatively movable with respect to the first component, in which method a seal assembly comprising a carrier supporting at least two spaced-apart rows of bristles is mounted on the first component such that the bristles project towards said surface of the second component, the physical characteristics of the two rows of bristles being different and being selected having regard to the operating conditions to which the seal assembly is to be subjected when in use, whereby the total pressure drop across the seal is shared between the two rows of bristles.

Most preferably, the pressure drop across each of the two rows of bristles is substantially the same.

The method of this invention may be used with a seal assembly having more than two rows of bristles, in which case the physical characteristics of all of the rows of bristles should be selected having regard to the operating conditions for the seal assembly whereby the pressure drop across each of the rows of bristles is substantially the same, when the seal assembly is in service.

The selection of the physical characteristics for the rows of bristles may be made empirically, and must of course be made before the seal is assembled and placed in service; the physical characteristics may be controlled by varying the parameters of each bristle in a row in the manner described above.

By way of example only, certain specific embodiments of seal assembly constructed and arranged in accordance with the present invention will now be described in detail, reference being made to the accompanying drawings, in which.

Figure 1:
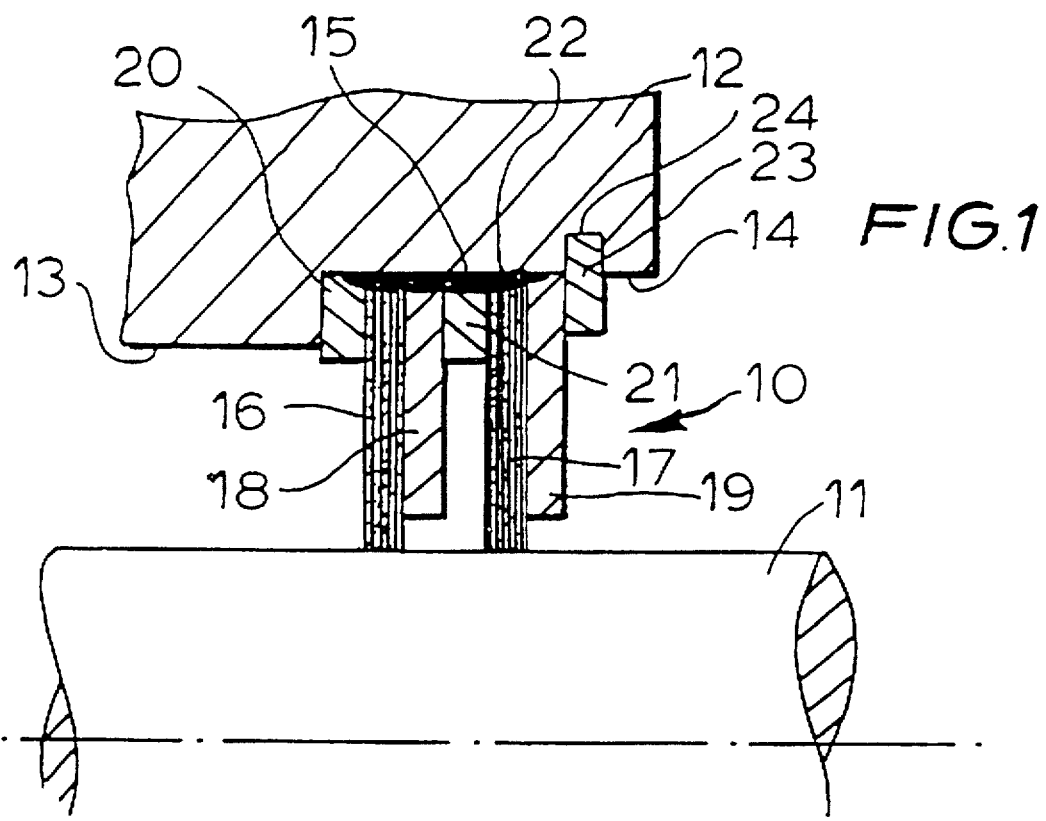
FIG.1 is a cross-section taken through a first embodiment of seal assembly, on a radial plane thereof.
Figure 2:
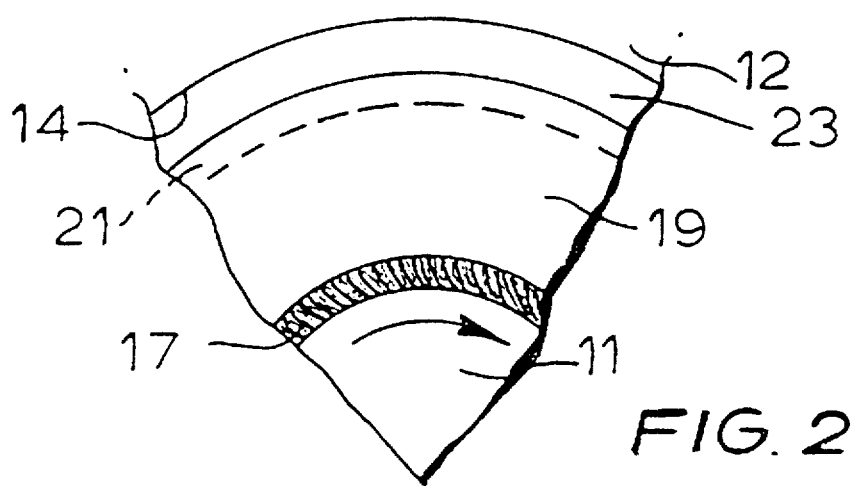
FIG. 2 is a partial axial end view on the seal illustrated in FIG. 1.

Referring initially to FIGS. 1 and 2, the first embodiment of brush seal assembly 10 of this invention is intended to effect a seal between a rotatable shaft 11 and a housing 12 having a bore 13 through which the shaft 11 extends. The seal assembly 10 is mounted in a counter-bore 14 co-axial with the bore 13, and comprises a base portion 15 from which extend two annular rows 16 and 17 of bristles held by the base portion 15 in a Parallel, spaced-apart configuration. The base portion includes firs and second annular backing plates 18 and 19 with the rows 16 and 17 of bristles lying against the respective backing plate so as to be supported thereby. An annular clamping member 21 is disposed between row 17 bristles and backing plate 18, and a similar clamping member 20 is disposed against row 16 of bristles.

Each row of comprises metallic wires, and the seal assembly is manufactured by a welding operation, performed around the peripheries of the two rows of bristles, the two backing plates, and the two clamping members, as illustrated by weld bead 22. In the alternative, and depending upon the materials from which the bristles are manufactured, the seal assembly could be manufactured by some other bonding process to give complete seal integrity. The finished seal assembly 10 is held in position in the counter-bore 14 by means of a circlip 23, located in a groove 24 formed in the counter-bore.

As can be seen, the tips of the bristles project beyond their associated backing plate and wipe against the shaft to effect a seal thereagainst. In use, the seal assembly is subjected to a high pressure difference, with row 16 of bristles facing the high pressure; in this way, the backing plates 18 and 19 support the rows 16 and 17 respectively of bristles against deflection towards the low pressure side of the unsupported. The materials from which the bristles of each row are made, as well as the physical characteristics of those bristles, are selected having regard to the intended operating conditions to which the seal is to be subjected, so that the total pressure drop is shared between the two rows of bristles. Depending upon the design requirements, the total pressure drop could be shared substantially equally by the two rows, or each row could accept a designed pressure drop different from that of the other row. To achieve this, the number of bristles in each row, the sizes of those bristles, the lengths of the bristles, and the cross-sectional profiles and dimensions of those bristles may all be varied to allow a complete row of bristles to have the required sealing effect. Moreover, mixtures of different kinds of bristles may be employed in each row, to give the required characteristics; for example, the diameters of the bristles or the materials from which they are made may be varied, in each row.

For example, in one specific embodiment of seal constructed generally as described above, the first row 16 of bristles may have an axial dimension in which is accommodated fifteen closely-packed bristles, whereas the second row 17 of bristles could have an axial dimension in which is accommodated eight closely-packed bristles, the bristles of the two rows otherwise being essentially the same. In an alternative example, intended to seal under the same operating conditions, the first row 16 of bristles may comprise a mixture of wires of 0.004 in. and 0.002 in. diameter (approximately $1.016\times10^{-1}$ and $5.08\times10^{-2}$ mm diameter), whereas the second row 17 of bristles comprises wires of 0.004 in. diameter only, the numbers of wires and the physical characteristics of those wires otherwise being substantially the same, in each row.

Taking as an example, a seal may be required to have an external diameter of approximately 12 in. (304.8 mm) and to be subjected to a super-ambient pressure of approximately 140 psi (about 9.5 bar). It may be necessary to provide a radial clearance of 0.09 in. (about 2.3 mm) between the shaft and the radially inner end of the backing plate in order to accommodate expected shaft excursions. If a single row brush seal of a known design were employed in these circumstances, the clearance of 0.09 in. would allow the tips of the bristles to deflect to an unacceptable extent under the pressure difference to which the seal is subjected, but using the examples of seal of this invention discussed above, having two rows of bristles with the pressure across each row balanced to be substantially the same, each row is subjected to only approximately 70 psi (about 4.75 bar) and so the tip deflection will be acceptable, notwithstanding the relatively high clearance between the shaft and the radially inner end of each backing plate.

Figure 3:
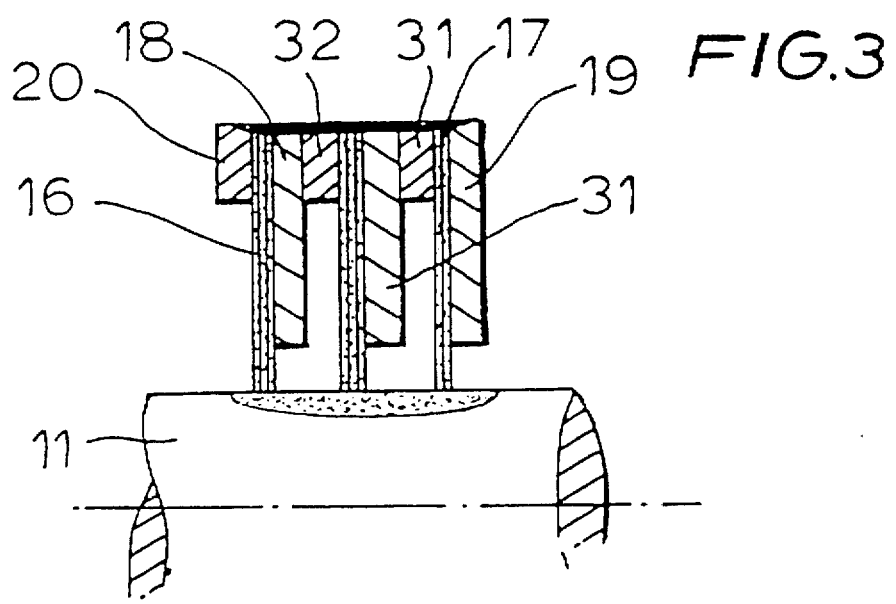
FIG. 3 is a diagrammatic cross-section on a second embodiment of seal assembly.

FIG. 3 shows a second embodiment of seal of this invention, and like components with those of FIG. 1 are given like reference characters; those components will not here be described again. The seal of FIG. 3 differs from that of FIGS. 1 and 2 in that a third row 30 of bristles, together with an associated backing plate 31 and clamping member 32, are disposed between the first row 16 and second row 17 of bristles. The third row 30 of bristles may have the same physical characteristics as either row 16 or row 17, or the third row 30 of bristles may have physical characteristics different from both of rows 16 and 17. Either way, the seal performance should be optimized by selecting the appropriate physical characteristics for all 3 rows such that the pressure difference across each row, when the seal is in service, is substantially the same. In this way, tip deflection of any one row of bristles under applied pressure may be minimized whilst still allowing relatively large clearances between the shaft and the radially inner ends of the backing plates 18, 19 and 31.

Figure 4:
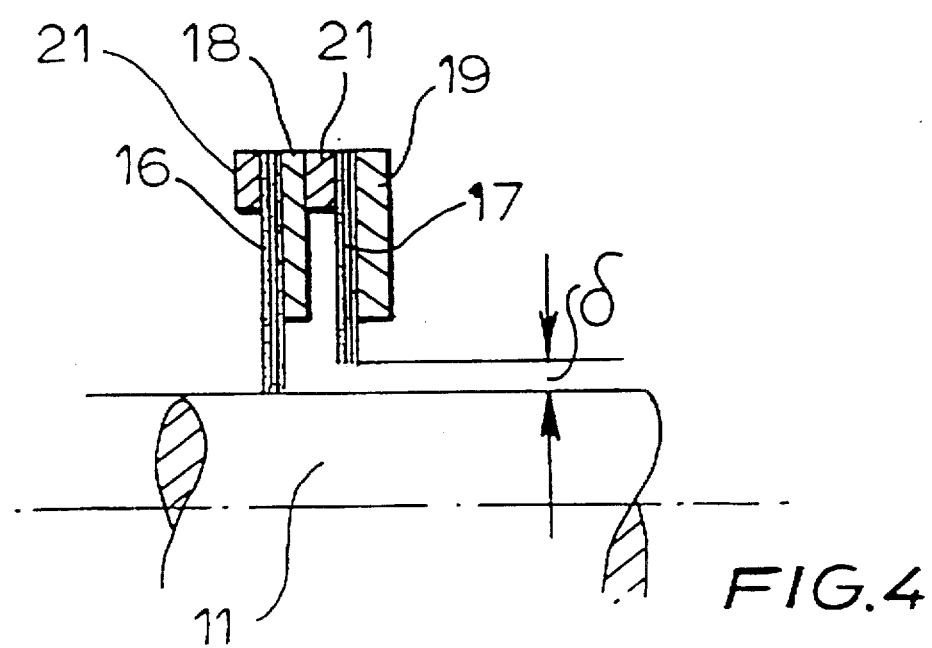
FIG. 4 is a diagrammatic cross-section on a third embodiment of seal assembly.

FIG. 4 shows a fourth embodiment of seal assembly of this invention, similar to that of FIGS. 1 and 2 but differing in that the second row 17 of bristles has an internal diameter slightly greater than that of the first row 16 of bristles; in this way, when the seal has been fully assembled with the shaft, there will be a small clearance δ between the tips of the bristles of the second row 17 and the shaft 11. Typically, that small clearance may be of the order of 0.002 in. (about $5.08\times10^{-2}$ mm). The leakage path produced by this clearance will reduce the pressure drop across row 17, allowing that pressure drop to be balanced against the pressure drop across row 16. Again, depending upon the exact operating parameters, it may be more advantageous to increase the interference between the bristles of row 16 and the shaft; in the alternative, the bristles of row 16 could be arranged to be clear of the shaft, with the tips of the bristles of row 17 rubbing the shaft.

I claim:

1. A brush seal assembly for effecting a seal between a first component and a surface of a second component relatively movable with respect to the first component, which seal assembly comprises a carrier adapted for mounting on the first component and including a first backing plate which extends towards said surface of the second component, a first row of bristles lying against the first backing plate to project therebeyond towards said surface of the second component, a second row of bristles spaced from said first row of bristles, and a second backing plate located between the first row of bristles and the second row of bristles, said second backing plate extends towards said surface of the second component and said second row of bristles lying against the second backing plate to project therebeyond towards said surface of the second component, the bristles of both rows have tips which interact with said surface and a majority of the bristles of the second row project towards said surface to a different radial extent from a majority of the bristles of the first row, whereby interaction between the bristle tips and said surface with which the tips seal is different for the two rows of bristles, respectively.

2. A brush seal assembly according to claim 1, wherein said second backing plate extends towards said surface to substantially the same radial extent as the first backing plate.

3. A brush seal assembly according to claim 1 wherein each row of bristles comprises a mixture of bristles having different characteristics, so controlling the sealing effect of the respective row, as a whole.

4. A brush seal assembly according to claim 1 wherein there is provided within the space between said first and second rows of bristles at least one further row of bristles configured generally similarly to said first and second rows of bristles, but spaced from both of said first and second rows of bristles.

5. A method of sealing a first component to a surface of a second component relatively movable with respect to the first component, in which method a seal assembly comprising a carrier supporting at least two spaced-apart rows of bristles is mounted on the first component such that the bristles project radially towards said surface of the second component, such that a majority of the bristles of one row project towards said surface to a different radial extent than the majority of bristles of the other row, the bristles of both rows having tips which interact with said surface and interaction between the bristle tips of one row and said surface being different from that of the other row and being selected having regard to the operating conditions to which the seal assembly is to be subjected when in use, whereby the total pressure drop across the seal is shared between the two rows of bristles.

6. A method according to claim 5, in which the interaction between the bristle tips of the two rows and said surface are selected such that the pressure drop across each of the two rows of bristles is substantially the same.

7. A method according to claim 5 in which the seal assembly has at least one further row of bristles disposed between said two rows of bristles, and the rows of bristles are arranged so that the pressure drop across each of the rows of bristles is substantially the same when the seal assembly is in service.

8. A method according to claim 5 in which at least one physical characteristic of the bristles of the rows thereof are selected from the group of characteristics consisting of the number of bristles, the cross-sectional dimensions of the bristles, the length of the bristles, the material from which each bristle is made, and the cross-sectional profile of each bristle, having regard to the total pressure difference to which the seal is to be subjected, the temperature on the high pressure side of the seal and the ambient temperature on the low pressure side thereof when in service, the diameter and intended surface speed of the second component against which the tips of the two rows of bristles effect a seal, and the nature of the gases on the high pressure side of the seal.

* * * * *